(12) United States Patent
Yao et al.

(10) Patent No.: US 8,149,454 B2
(45) Date of Patent: Apr. 3, 2012

(54) COLOR PRINTING

(75) Inventors: Meng Yao, West Linn, OR (US);
Michael T. Stevens, Aloha, OR (US);
Paul W. Philippi, Sherwood, OR (US);
Michael D. Stevens, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 1223 days.

(21) Appl. No.: 11/149,599

(22) Filed: Jun. 9, 2005

(65) Prior Publication Data
US 2006/0279753 A1 Dec. 14, 2006

(51) Int. Cl.
*H04N 1/60* (2006.01)
*H04N 1/405* (2006.01)
*H04N 1/56* (2006.01)
*G06F 3/12* (2006.01)
*G03F 3/10* (2006.01)

(52) U.S. Cl. ....... 358/1.9; 358/3.23; 358/1.13; 358/501; 358/515; 358/516; 358/518; 358/523; 358/536; 382/167

(58) Field of Classification Search .................. 358/1.9, 358/3.23, 1.13, 501, 515, 516, 518, 523, 358/536; 382/167
See application file for complete search history.

(56) References Cited

U.S. PATENT DOCUMENTS

| | | | | |
|---|---|---|---|---|
| 5,113,248 A * | 5/1992 | Hibi et al. | | 358/501 |
| 5,121,195 A * | 6/1992 | Seki et al. | | 358/515 |
| 5,333,069 A * | 7/1994 | Spence | | 358/517 |
| 5,493,321 A * | 2/1996 | Zwadlo | | 347/131 |
| 5,528,377 A * | 6/1996 | Hutcheson | | 358/1.9 |
| 5,589,954 A * | 12/1996 | Watanabe | | 358/518 |
| 5,687,300 A * | 11/1997 | Cooper | | 358/1.9 |
| 5,754,924 A * | 5/1998 | Yamada | | 399/81 |
| 5,887,124 A | 3/1999 | Iwasaki et al. | | |
| 6,027,201 A * | 2/2000 | Edge | | 347/19 |
| 6,081,344 A * | 6/2000 | Bockman et al. | | 358/1.9 |
| 6,224,189 B1 * | 5/2001 | Kletter | | 347/43 |
| 6,271,940 B1 * | 8/2001 | Deschuytere et al. | | 358/504 |
| 6,335,800 B1 * | 1/2002 | Balasubramanian | | 358/1.9 |
| 6,574,010 B1 | 6/2003 | Ohnuma et al. | | |
| 6,694,109 B1 * | 2/2004 | Donaldson et al. | | 399/49 |
| 6,765,690 B1 * | 7/2004 | Matsumoto et al. | | 358/1.2 |
| 6,912,064 B1 * | 6/2005 | Fujita | | 358/1.9 |
| 6,975,437 B2 * | 12/2005 | Takemoto | | 358/518 |
| 7,253,925 B2 * | 8/2007 | Ito | | 358/1.9 |
| 7,355,748 B2 * | 4/2008 | Arai et al. | | 358/1.9 |
| 7,394,566 B2 * | 7/2008 | Yao | | 358/1.9 |
| 2002/0085235 A1 * | 7/2002 | Degani et al. | | 358/3.06 |
| 2003/0142110 A1 * | 7/2003 | Murashita | | 345/600 |

(Continued)

FOREIGN PATENT DOCUMENTS

EP 0 613 062 A1 8/1994

(Continued)

OTHER PUBLICATIONS

Meng Yao; Calibration of Color Devices; U.S. Appl. No. 10/945,600, filed Sep. 20, 2004.

(Continued)

*Primary Examiner* — King Poon
*Assistant Examiner* — Beniyam Menberu
(74) *Attorney, Agent, or Firm* — Fay Sharpe LLP

(57) ABSTRACT

A method of operating a color printer including using a first set of one-dimensional TRCs or a second set of one-dimensional TRCs with a single set of color tables.

4 Claims, 3 Drawing Sheets

U.S. PATENT DOCUMENTS

| | | | |
|---|---|---|---|
| 2003/0164960 A1* | 9/2003 | Housel | 358/1.9 |
| 2004/0012817 A1* | 1/2004 | Brewington et al. | 358/3.06 |
| 2004/0070775 A1* | 4/2004 | Yao et al. | 358/1.9 |
| 2004/0070776 A1* | 4/2004 | Yao et al. | 358/1.9 |
| 2004/0257595 A1* | 12/2004 | Sharma et al. | 358/1.9 |
| 2005/0012944 A1* | 1/2005 | Yao | 358/1.9 |
| 2005/0018222 A1 | 1/2005 | Yoshida | |
| 2005/0071104 A1* | 3/2005 | Viturro et al. | 702/85 |
| 2005/0094170 A1* | 5/2005 | Ichitani | 358/1.9 |
| 2005/0231742 A1* | 10/2005 | Hirano | 358/1.9 |
| 2005/0281459 A1* | 12/2005 | Bala et al. | 382/162 |
| 2006/0050317 A1* | 3/2006 | Foster et al. | 358/3.06 |
| 2006/0061782 A1* | 3/2006 | Yao | 358/1.9 |
| 2006/0132867 A1* | 6/2006 | Sugiyama et al. | 358/504 |
| 2006/0203290 A1* | 9/2006 | Ito | 358/3.1 |
| 2006/0251437 A1* | 11/2006 | Donaldson | 399/49 |
| 2006/0285134 A1* | 12/2006 | Viturro et al. | 358/1.9 |

FOREIGN PATENT DOCUMENTS

| | | |
|---|---|---|
| EP | 0 791 892 A2 | 8/1997 |
| EP | 0 791892 B1 | 4/2005 |
| EP | 1 638 313 A1 | 3/2006 |
| JP | 09-083819 | 3/1997 |
| JP | 2003-198841 A | 7/2003 |

OTHER PUBLICATIONS

European Search Report for European Patent Application No. 06 115 152.8, dated Jun. 24, 2008, 3 pages.

* cited by examiner

FIG. 1
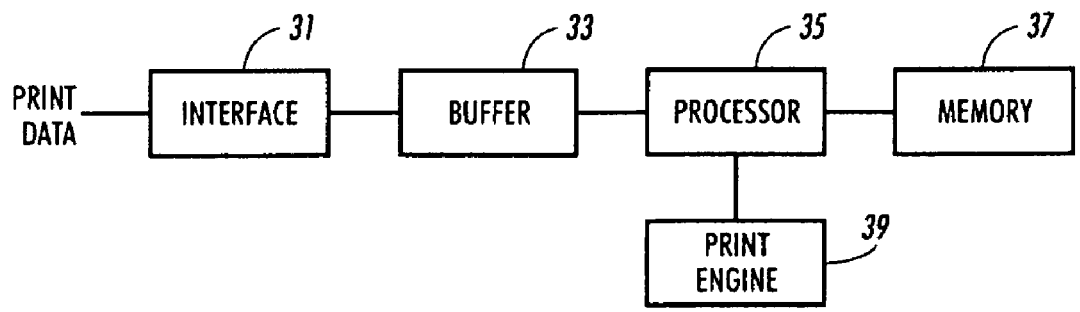
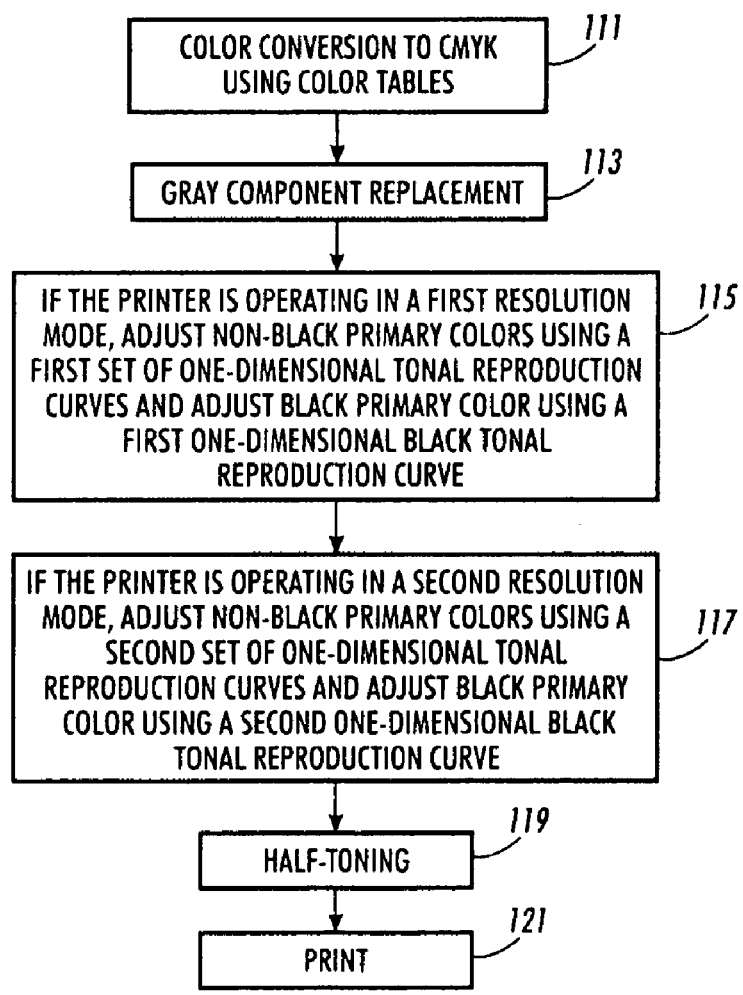
FIG. 2

$$C_{adj} = C2 * c'\_tbl[C] + green * green'\_C[C] + blue*blue'\_C[C] + GRAY * graybal'\_C[C]$$

$$M_{adj} = M2 * m'\_tbl[M] + red * red'\_M[M] + blue*blue'\_M[M] + GRAY * graybal'\_M[M]$$

$$Y_{adj} = Y2 * y'\_tbl[Y] + red * red'\_Y[Y] + green * green'\_Y[Y] + GRAY * graybal'\_Y[Y]$$

GENERATE FIRST SET OF ONE-DIMENSIONAL TRCs — 211

GENERATE SECOND SET OF ONE-DIMENSIONAL TRCs FOR A DIFFERENT PRINT RESOLUTION MODE AND WHICH ARE CONFIGURED SUCH THAT THE COLOR OUTPUT PRODUCED USING THE SECOND SET OF TRCs SUBSTANTIALLY COLORIMETRICALLY MATCHES THE COLOR OUTPUT PRODUCED USING THE FIRST SET OF ONE-DIMENSIONAL TRCs — 213

FIG. 5

COLOR PRINTING

BACKGROUND

The subject disclosure is generally directed to color printing.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

It can be difficult to calibrate color printers.

BRIEF DESCRIPTION OF DRAWINGS

FIG. 1 is a schematic block diagram of an embodiment of a printing system.

FIG. 2 is a schematic diagram of an embodiment of an image processing pipeline.

FIG. 4 is an embodiment of alternative calculations that can be employed in the procedure of FIG. 3.

FIG. 5 is schematic flow diagram of an embodiment of a procedure for generating first and second sets of one-dimensional TRCs that can be employed with a single set of color tables.

DETAILED DESCRIPTION

Figure 3:
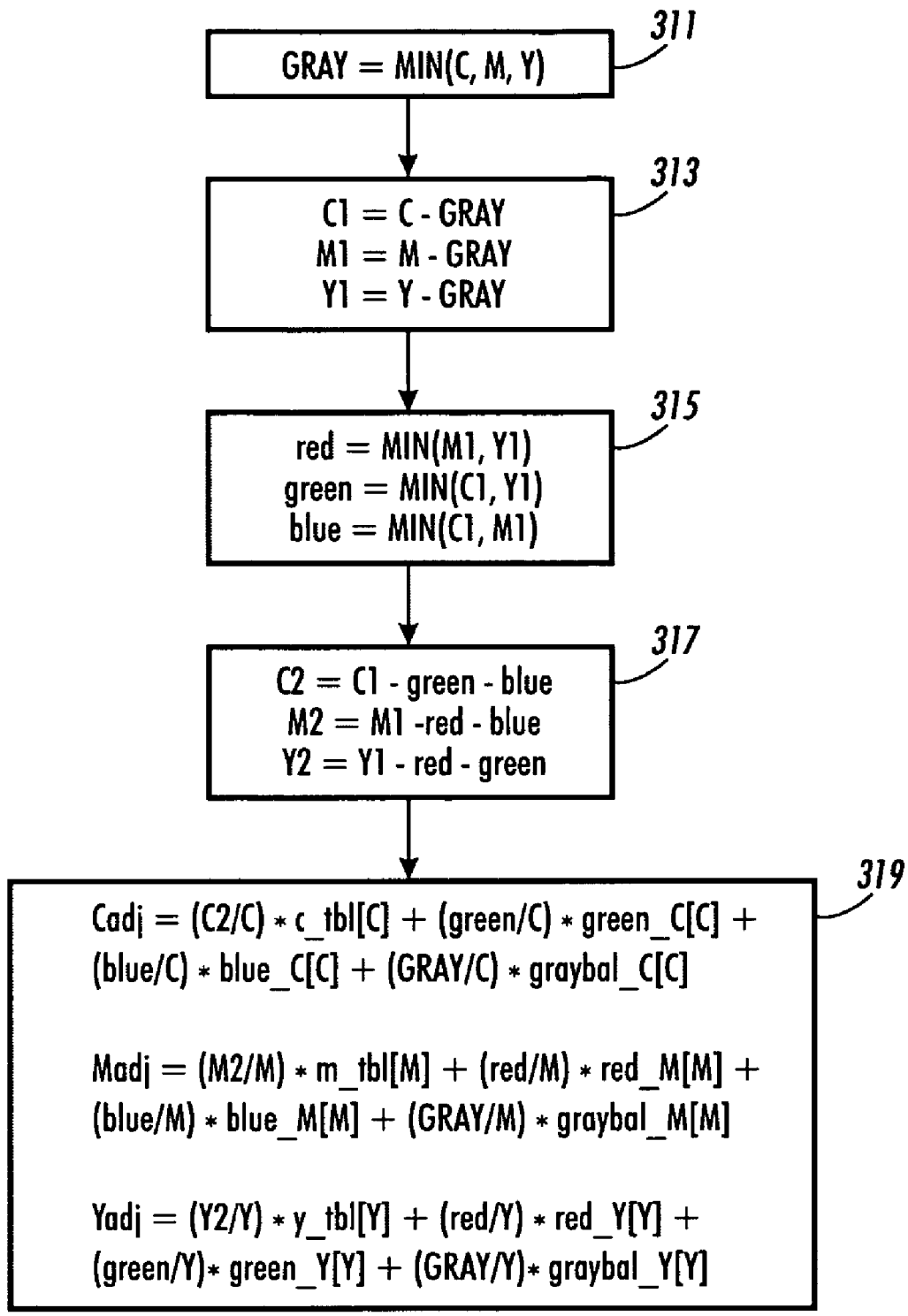
FIG. 3 is a schematic flow diagram of an embodiment of a procedure for adjusting non-black primary colors using a plurality of one-dimensional look-up tables for each non-black primary color.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

FIG. 2 is a block diagram of an embodiment of a portion of an image processing pipeline for a color printer. At 111 input color data is transformed to printer color space such as CMYK which employs the primary colors of cyan, magenta, yellow and black, for example using color tables. At 113 gray component replacement is performed on printer primary color data, wherein some amounts of the non-black primary colors are replaced with black. At 115, if the printer is operating in a first resolution mode, the non-black primary colors are adjusted using a first set of one-dimensional tone reproduction curves (TRCs), and the black primary color is adjusted using a first one-dimensional black tonal reproduction curve. At 116, if the printer is operating in a second resolution mode, the non-black primary colors are adjusted using a second set of one-dimensional tone reproduction curves (TRCs), and the black primary color is adjusted using a second one-dimensional black tonal reproduction curve. In this manner, the same color tables are employed when the printer is operated in either a first resolution mode or a second resolution mode. By way of illustrative example, each set of one-dimensional TRCs can include gray balancing related primary color TRCs, primary component related primary color TRCs and secondary color related primary color TRCs, as disclosed further herein. At 119 half-toning is performed, and at 121 printing takes place. The one-dimensional TRCs employed in the disclosed embodiments can be implemented as one-dimensional look-up tables, for example.

The adjustments at 115, 116 and 117 can be employed to calibrate the printing apparatus, for example. For ease of reference, the embodiments disclosed herein employ C, M, Y, K primary colors.

FIG. 3 is a schematic flow diagram of an embodiment of a procedure that can be employed at 115 and 116 (FIG. 2) for adjusting non-black primary color values, such as CMY, using a plurality of one-dimensional TRCs for each non-black primary color.

At 311 a GRAY component is set to the minimum of the original or input non-black primary colors C, M, Y values. As to each of such C, M, Y values, GRAY comprises the amount of a non-black primary color that contributes to the gray of the particular C, M, Y data and can be called a gray component of a non-black primary color.

At 313 the GRAY component is subtracted from each of the non-black primary color inputs C, M, Y to arrive at versions C1, M1, Y1 of the non-black primary colors from which the GRAY component has been removed.

At 315 the secondary colors red, green and blue are set to the minimums of the appropriate combinations (M1, Y1), (C1, Y1), (C1, M1) of the non-black primary color values from which the GRAY component has been removed. As to each of the C, M, Y values, green comprises the amounts of cyan and yellow that contribute to the green secondary color of the particular C, M, Y data, blue comprises the amounts of cyan and magenta that contribute to the blue secondary color of the particular C, M, Y data, and red comprises the amounts of magenta and yellow that contribute to the red secondary color of the particular C, M, Y data. It should be appreciated that in this example there is at most one non-zero secondary color for any set of C, M, Y values, since at least one of C1, M1, Y1 as calculated at 313 is zero. The portion of a non-black primary color value that contributes to a secondary color can be conveniently called a secondary color component of the non-black primary color value (e.g., the green component of the cyan color value, the blue component of the cyan color value, etc.). For ease of reference, a secondary color component of a primary color value can sometimes be called a secondary component of a primary color (e.g., the blue component of magenta, the red component of magenta, etc.).

At 317 a primary component of each of the non-black primary color values is obtained by subtracting appropriate secondary color components from the non-black primary color values from which the GRAY component has been removed. In particular, green and blue are removed from C1 to obtain a primary component C2 of the cyan color value C, red and blue are removed from M1 to obtain a primary component M2 of the magenta color value M, and red and green are removed from Y1 to obtain a primary component Y2 of the yellow color value Y. While the C, M, Y values form at most one secondary color in this example, the equations at 317 are generalized to include the three possible secondary colors.

At 319 or 319A (FIG. 4) respective adjusted non-black primary color values are obtained by summing for each non-black primary color a respective contribution of a gray balancing related primary color TRC for balancing gray (which can be called a gray balancing contribution), a respective contribution of a secondary color related primary color TRC (which can be called a secondary color contribution), and a respective contribution of a primary component related primary color TRC (which can be called a primary contribution), wherein the index to each of the TRCs comprises the original primary color value.

In particular as to cyan, at 319 an adjusted cyan color value Cadj can be obtained by:

$$Cadj = (C2/C) * c\_tbl[C] + (green/C) * green\_C[C] +$$
$$(blue/C) * blue\_C[C] + (GRAY/C) * graybal\_C[C]$$

wherein (C2/C) comprises the fractional portion or relative amount of the cyan color value C that comprises the primary component of the cyan color value C, c_tbl[ ] comprises a one-dimensional primary component related cyan TRC for adjusting (e.g., linearizing) cyan, (green/C) comprises the fractional portion or relative amount of the cyan color value C that comprises the green component of the cyan color value C, green_C[ ] comprises a one-dimensional green related cyan TRC, (blue/C) comprises the fractional portion or relative amount of the cyan color value C that comprises the blue component of the cyan color value C, blue_C[ ] comprises a one-dimensional blue related cyan TRC, (GRAY/C) comprises the fractional portion or relative amount of the cyan color value C that comprises the gray component of the cyan color value C, and graybal_C[ ] is a one-dimensional gray balancing related cyan TRC for balancing gray.

In this manner, (C2/C)*c_tbl[C] comprises a contribution of a primary component related cyan TRC for adjusting cyan, wherein the primary component related cyan TRC value c_tbl[C] as indexed by the cyan color value C is scaled or weighted by the relative amount of the cyan color value C that comprises the primary component of the cyan color value C. (green/C)*green_C[C] comprises a contribution of a green related cyan TRC, wherein the green related cyan TRC value green_C[C] as indexed by the cyan color value C is scaled or weighted by the relative amount of the cyan color value C that comprises the green component of the cyan color value C. (blue/C)*blue_C[C] comprises a contribution of a blue related cyan TRC, wherein the blue related cyan TRC value blue_C[C] as indexed by the cyan color value C is scaled or weighted by the relative amount of the cyan color value C that comprises the blue component of the cyan color value C. (GRAY/C)*graybal_C[C] comprises a contribution of a gray balancing related cyan TRC for balancing gray, wherein the gray balancing related cyan TRC value graybal_C[C] is scaled or weighted by the relative amount of the cyan color value C that comprises the gray component of the cyan color value C.

The first equation at 319 can be rewritten as follows:

$$Cadj = C2 * c\_tbl[C]/C + green * green\_C[C]/C +$$
$$blue * blue\_C[C]/C + GRAY * graybal\_C[C]/C$$

This shows that in calculating an adjusted cyan value the division by C can be performed on each of the one-dimensional TRC values. Accordingly, at 319A normalized TRCs c'_tbl[ ], green'_C[ ], blue'_C[ ] and graybal'_C[ ] (wherein c'_tbl[C]=c_tbl[C]/C, green'_C[C]=green_C[C]/C, blue'_C[C]=blue_C[C]/C and graybal'_C[C]=graybal_C[C]/C) can be employed to obtain an adjusted cyan color value Cadj:

$$Cadj = C2 * c'\_tbl[C] + green * green'\_C[C] +$$
$$blue * blue\_C[C] + (GRAY) * graybal'\_C[C]$$

wherein C2 comprises the amount or portion of the cyan color value C that comprises the primary component of cyan, c'_tbl[ ] comprises a normalized one-dimensional primary component related cyan TRC for adjusting (e.g., linearizing) cyan, green comprises the green component of the cyan color value C, green'_C[ ] comprises a normalized one-dimensional green related cyan TRC, blue comprises the blue component of the cyan color value C, blue'_C[ ] comprises a normalized one-dimensional blue related cyan TRC, GRAY comprises the gray component of the cyan color value C, and graybal'_C[ ] is a normalized one-dimensional gray balancing related cyan TRC for balancing gray.

In this manner, C2*c'_tbl[C] comprises a contribution of a normalized primary component related cyan TRC for adjusting (e.g., linearizing) cyan, wherein the normalized primary component related cyan TRC value c'_tbl[C] as indexed by the cyan color value C is scaled or weighted by the amount of the cyan color value C that comprises the primary component of the cyan color value C. (green)*green'_C[C] comprises a contribution of a normalized green related cyan TRC, wherein the normalized green related cyan TRC value green'_C[C] as indexed by the cyan color value C is scaled or weighted by the amount of the cyan color value C that comprises the green component of the cyan color value C. (blue)*blue'_C[C] comprises a contribution of a normalized blue related cyan TRC, wherein the normalized blue related cyan TRC value blue'_C[C] as indexed by the cyan color value C is scaled or weighted by the amount of the cyan color value C that comprises the blue component of the cyan color value C. (GRAY)*graybal'_C[C] comprises a contribution of a normalized gray balancing related cyan TRC, wherein the normalized gray balancing related cyan TRC value graybal'_C[C] is scaled or weighted by the amount of the cyan color value C that comprises the gray component of the cyan color value C.

In particular as to magenta, at 319 an adjusted magenta color value Madj can be obtained by:

$$Madj = (M2/M) * m\_tbl[M] + (red/M) * red\_M[M] +$$
$$(blue/M) * blue\_M[M] + (GRAY/M) * graybal\_M[M]$$

wherein (M2/M) comprises the fractional portion or relative amount of the magenta color value M that comprises the primary component of the magenta color value M, m_tbl[ ] comprises a one-dimensional primary component related magenta TRC for adjusting (e.g., linearizing) magenta, (red/M) comprises the fractional portion or relative amount of the magenta color value M that comprises the red component of the magenta color value M, red_M[ ] comprises a one-dimensional red related magenta TRC, (blue/M) comprises the fractional portion or relative amount of the magenta color value M that comprises the blue component of the magenta color value M, blue_M[ ] comprises a one-dimensional blue related magenta TRC, (GRAY/M) comprises the fractional portion or relative amount of the magenta color value M that comprises the gray component of the magenta color value M, and graybal_M[ ] is a one-dimensional gray balancing related magenta TRC for balancing gray.

In this manner, (M2/M)*m_tbl[M] comprises a contribution of a primary component related magenta TRC for adjusting magenta, wherein the primary component related magenta TRC value m_tbl[M] as indexed by the magenta color value M is scaled or weighted by the relative amount of the magenta color value M that comprises the primary component of the magenta color value M. (red/M)*red_M[M] comprises a contribution of a red related magenta TRC, wherein the red related magenta TRC value red_M[M] as indexed by the magenta color value M is scaled or weighted by the relative amount of the magenta color value M that comprises the red component of the magenta color value M. (blue/M)*blue_M[M] comprises a contribution of a blue related magenta TRC, wherein the blue related magenta TRC value blue_M[M] as indexed by the magenta color value M is scaled or weighted by the relative amount of the magenta color value M that comprises the blue component of the magenta color value M. (GRAY/M)*graybal_M[M] comprises a contribution of a gray balancing related magenta TRC for balancing gray, wherein the gray balancing related magenta TRC value graybal_M[M] s scaled or weighted by the relative amount of the magenta color value M that comprises the gray component of the magenta color value M.

The second equation at 319 can be rewritten as follows:

$$Madj = M2*m\_tbl[M]/M + red*red\_M[M]/M +$$
$$blue*blue\_M[M]/M + GRAY*graybal\_M[M]/M$$

This shows that in calculating an adjusted magenta value the division by M can be performed on each of the one-dimensional TRC values. Accordingly, at 319A normalized TRCs m'_tbl[ ], red'_M[ ], blue'_M[ ] and graybal'_M[ ] (wherein m'_tbl[M]=m_tbl[M]/M, red'_M[M]=red_M[M]/M, blue'_M[M]=blue_M[M]/M and graybal'_M[M]=graybal_M[M]/M) can be employed to obtain an adjusted magenta color value Madj:

$$Madj = M2*m'\_tbl[M] + red*red'\_M[M] +$$
$$blue*blue'\_M[M] + GRAY*graybal'\_M[M]$$

wherein M2 comprises the amount or portion of the magenta color value M that comprises the primary component of magenta, m'_tbl[ ] comprises a normalized one-dimensional primary component related magenta TRC for adjusting (e.g., linearizing) magenta, red comprises the red component of the magenta color value M, red'_M[ ] comprises a normalized one-dimensional red related magenta TRC, blue comprises the blue component of the magenta color value M, blue'_M[ ] comprises a normalized one-dimensional blue related magenta TRC, GRAY comprises the gray component of the magenta color value M, and graybal'_M[ ] is a normalized one-dimensional gray balancing related magenta TRC for balancing gray.

In this manner, M2*m'_tbl[M] comprises a contribution of a normalized primary component related magenta TRC for adjusting (e.g., linearizing) magenta, wherein the normalized primary component related magenta TRC value m'_tbl[M] as indexed by the magenta color value M is scaled or weighted by the amount of the magenta color value M that comprises the primary component of the magenta color value M. (red)*red'_M[M] comprises a contribution of a normalized red related magenta TRC, wherein the normalized red related magenta TRC value red'_M[M] as indexed by the magenta color value M is scaled or weighted by the amount of the magenta color value M that comprises the red component of the magenta color value M. (blue)*blue'_M[M] comprises a contribution of a normalized blue related magenta TRC, wherein the normalized blue related magenta TRC value blue'_M[M] as indexed by the magenta color value M is scaled or weighted by the amount of the magenta color value M that comprises the blue component of the magenta color value M. (GRAY)*graybal'_M[M] comprises a contribution of a normalized gray balancing related magenta TRC, wherein the normalized gray balancing related magenta TRC value graybal'_M[M] is scaled or weighted by the amount of the magenta color value M that comprises the gray component of the magenta color value M.

In particular as to yellow, at 319 an adjusted yellow color value Yadj can be obtained by:

$$Yadj = (Y2/Y)*y\_tbl[Y] + (red/Y)*red\_Y[Y] +$$
$$(green/Y)*green\_Y[Y] + (GRAY/Y)*graybal\_Y[Y]$$

wherein (Y2/Y) comprises the fractional portion or relative amount of the yellow color value Y that comprises the primary component of the yellow color value Y, y_tbl[ ] comprises a one-dimensional primary component related yellow TRC for adjusting (e.g., linearizing) yellow, (red/Y) comprises the fractional portion or relative amount of the yellow color value Y that comprises the red component of the yellow color value Y, red_Y[ ] comprises a one-dimensional red related yellow TRC, (green/Y) comprises the fractional portion or relative amount of the yellow color value Y that comprises the green component of the yellow color value Y, green_Y[ ] comprises a one-dimensional green related yellow TRC, (GRAY/Y) comprises the fractional portion or relative amount of the yellow color value Y that comprises the gray component of the yellow color value Y, and graybal_Y[ ] is a one-dimensional gray balancing related yellow TRC for balancing gray.

In this manner, (Y2/Y)*y_tbl[Y] comprises a contribution of a primary component related yellow TRC for adjusting yellow, wherein the primary component related yellow TRC value y_tbl[Y] as indexed by the yellow color value Y is scaled or weighted by the relative amount of the yellow color value Y that comprises the primary component of the yellow color value Y. (red/Y)*red_Y[Y] comprises a contribution of a red related yellow TRC, wherein the red related yellow TRC value red_Y[Y] as indexed by the yellow color value Y is scaled or weighted by the relative amount of the yellow color value Y that comprises the red component of the yellow color value Y. (green/Y)*green_Y[Y] comprises a contribution of a green related yellow TRC, wherein the green related yellow TRC value green_Y[Y] as indexed by the yellow color value Y is scaled or weighted by the relative amount of the yellow color value Y that comprises the green component of the yellow color value Y. (GRAY/Y)*graybal_Y[Y] comprises a contribution of a gray balancing related yellow TRC for balancing gray, wherein the gray balancing related yellow TRC value graybal_Y[Y] is scaled or weighted by the relative amount of the yellow color value Y that comprises the gray component of the yellow color value Y.

The third equation at 319 can be rewritten as follows:

$$Yadj = Y2*y\_tbl[Y]/Y + red*red\_Y[Y]/Y +$$
$$green*green\_Y[Y]/Y + GRAY*graybal\_Y[Y]/Y$$

This shows that in calculating an adjusted yellow value the division by Y can be performed on each of the one-dimensional TRC values. Accordingly, at 319A normalized TRCs y'_tbl[ ], red'_Y[ ], green'_Y[ ] and graybal'_Y[ ] (wherein y'_tbl[Y]=y_tbl[Y]/Y, red'_Y[Y]=red_Y[Y]/Y, green'_Y[Y]=green_Y[Y]/Y and graybal'_Y[Y]=graybal_Y[Y]/Y) can be employed to obtain an adjusted yellow color value Yadj:

$$Yadj = Y2*y'\_tbl[Y] + red*red'\_Y[Y] + green*green'\_Y[Y] + GRAY*graybal'\_Y[Y]$$

wherein Y2 comprises the amount or portion of the yellow color value Y that comprises the primary component of yellow, y'_tbl[ ] comprises a normalized one-dimensional primary component related yellow TRC for adjusting (e.g., linearizing) yellow, red comprises the red component of the yellow color value Y, red'_Y[ ] comprises a normalized one-dimensional red related yellow TRC, green comprises the green component of the yellow color value Y, green'_Y[ ] comprises a normalized one-dimensional green related yellow TRC, GRAY comprises the gray component of the yellow color value Y, and graybal'_Y[ ] is a normalized one-dimensional gray balancing related yellow TRC for balancing gray.

In this manner, Y2*y'_tbl[Y] comprises a contribution of a normalized primary component related yellow TRC for adjusting (e.g., linearizing) yellow, wherein the normalized primary component related yellow TRC value y'_tbl[Y] as indexed by the yellow color value Y is scaled or weighted by the amount of the yellow color value Y that comprises the primary component of the yellow color value Y. (red)*red'_Y[Y] comprises a contribution of a normalized red related yellow TRC, wherein the normalized red related yellow TRC value red'_Y[Y] as indexed by the yellow color value Y is scaled or weighted by the amount of the yellow color value Y that comprises the red component of the yellow color value Y. (green)*green'_Y[Y] comprises a contribution of a normalized green related yellow TRC, wherein the normalized green related yellow TRC value green'_Y[Y] as indexed by the yellow color value Y is scaled or weighted by the amount of the yellow color value Y that comprises the green component of the yellow color value Y. (GRAY)*graybal'_Y[Y] comprises a contribution of a normalized gray balancing related yellow TRC, wherein the normalized gray balancing related yellow TRC value graybal'_Y[Y] is scaled or weighted by the amount of the yellow color value Y that comprises the gray component of the yellow color value Y.

Generally, for each non-black primary color, a gray portion or component, a secondary color portion or component, and a primary portion or component are determined. A non-zero non-black primary color can include one or more of such components. For each non-black primary color, a contribution of a gray balancing related primary color TRC is determined, a contribution of a secondary color related primary color TRC is determined and a contribution of a primary component related primary color TRC is determined, for example using the primary color value as an index into the TRCs and scaling the TRC values by the amount (e.g., relative or absolute, depending upon the values of the TRCs) of the non-black primary color that the particular component comprises. An adjusted non-black primary color value is obtained by combining the contribution of the primary component related primary color TRC, the contribution of the secondary color related primary color TRC and the contribution of the gray balancing related primary color TRC.

In regard to the adjustments at 115 and 116 of FIG. 2, each set of TRCs can include one-dimensional gray balancing related primary color TRCs, one-dimensional primary component related primary color TRCs and one-dimensional secondary color related primary color TRCs that are employed as described above.

FIG. 5 is a schematic flow diagram of an embodiment of a procedure for generating a first set of one-dimensional TRCs and a second set of one-dimensional TRCs that can be employed with a single set of color tables. At 211 a first set of TRCs is generated for a first print resolution mode, for example for the highest print quality or resolution mode. The first set of one-dimensional TRCs can include for example primary component related primary color TRCs, secondary color related primary color TRCs, and gray balancing related primary color TRCs. At 213 a second set of TRCs is generated for a second print resolution mode that is different from the first print resolution mode, for example for a print resolution mode that is less than the highest print resolution mode, and wherein the second set of TRCs are configured such that the color output produced using the second set of TRCs substantially calorimetrically matches the color output produced using the first set of TRCs.

The one-dimensional primary component related primary color TRCs of the first set that are scaled to provide primary component related primary color TRC contributions can be obtained by printing cyan patches, magenta patches, and yellow patches at different coverages and linearizing them based on L*, ΔE, etc.

The one-dimensional green related cyan and yellow TRCs of the first set that are scaled to provide green related cyan and yellow TRC contributions can be obtained by printing green patches at different coverages and linearizing them based on L*, ΔE, etc. This can be done without applying the primary component related one-dimensional TRCs to the cyan and yellow components. Alternatively, this can be done with the primary component related one-dimensional TRCs applied to the cyan and yellow components. For example, the TRCs for C, M, Y, K can be incorporated into the halftone threshold arrays, so that the green TRCs are generated with the primary component related TRCs already applied to C and Y. Hue adjustment can be incorporated into the green related cyan and/or yellow TRCs to make green more cyan or more yellow, for example depending upon the desired calibration. If no hue adjustments to green are to be made, green_C[ ] and green_Y[ ] can be identical, and green'_C[ ] and green'_Y[ ] can be identical.

The one-dimensional blue related cyan and magenta TRCs and the red related magenta and yellow TRCs of the first set can be obtained similarly, for example without applying the one-dimensional primary component related primary color TRCs.

To generate the second set of TRCs for a different print mode, primaries can be linearized first for this print mode based on L*, ΔE, etc., which is similar to the generation of the first set of TRCs. Alternatively, L*, a*, b* values for the primaries in first print mode can be used as targets for the second print mode. For example, for 30% cyan in the second print mode, we can try to match it calorimetrically to the 30% cyan in the first print mode. The gray balancing TRCs can also be generated in a way similar to the first set of TRCs. Alternatively, the L*, a*, b* values for the balanced grays in the first print mode can be used as targets for the second print mode. For example, for 30% composite gray (composed of equal amounts of C, M and Y) in the second print mode, we can try to match it calorimetrically to the 30% balanced gray in the first print mode. To generate secondary TRCs, a target for each data point on the TRCs is established first. For example, for 30% green, we want to find the appropriate L*, a*, b* value first. The L* value can be obtained by assuming that the output greens at different percentages are linearized based on L* measurements. As an example, if 0% green (paper white) is 95.0 in L*, and 100% green is 45.0 in L*, these two points fall on a line that is defined by L*=−(95.0−45.0)*X+95.0, where X is the green percentage and L* is the target L* value. Therefore, for 30% green, the target L* value in this case is L*=−(95−45)*0.3+95=80.0. One of the ways to establish the target a*, b* values for 30% green, is to find the green in the first print mode with the same lightness as the 30% green in the second print mode. For example, in the first print mode, 25% green has L*, a*, b* values of 80.0, −17.0, 8.0, which has the same lightness as the 30% green for the second print mode. Then, 80.0, −17.0, 8.0 will be used as the target L*, a*, b* values for the 30% green in the second print mode. A colorimetric match will be used to find the ink mixing that would produce L*, a*, b* values of 80.0, −17.0, 8.0 in the second print mode. As an example, if 32% cyan plus 27% yellow produces L*, a*, b* values of 80.0, −17.0, 8.0 in the second print mode, we have obtained a data point on the two TRCs: green_C, and green_Y. The data point for green_C is (0.3, 0.32) (0.3 is input, 0.32 is output), and the data point for green_Y is (0.3, 0.27). Another way of establishing the target L*, a*, b* values for the 30% green in the second print mode is to use the L*, a*, b* values for the 30% green in the first print mode. For example, if 30% green in the first print mode has L*, a*, b* values of 77.0, −20.0, 11.0, we can use this set of values as the target L*, a*, b* values for the 30% green in the second mode, and then use calorimetric matching to find the color mixing that would produce this set of L*, a*, b* values. In this manner, the second set of TRCs are configured such that the second print mode output colorimetrically matches the first print mode output. The second set of TRCs can be considered as being calorimetrically matched to the first set of TRCs in the sense that the respective print outputs are calorimetrically matched.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of operating a color printer comprising:
    transforming input color print data to printer color space primary colors using a predetermined conversion color table, the printer color space primary colors including non-black primary colors;
    if the printer is operating in a first resolution mode, then adjusting the non-black primary color values associated with the printer color space primary colors using a first color table with contributions from a first one-dimensional gray balancing related primary color TRC, a first one-dimensional primary component related primary color TRC, and a first one-dimensional secondary component related primary color TRC;
    if the printer is operating in a second resolution mode, then adjusting non-black primary color values associated with the printer color space primary colors using a second color table with contributions from a second one-dimensional gray balancing related primary color TRC, a second one-dimensional primary component related primary color TRC, and a second one-dimensional secondary component related primary color TRC;
    whereby the same conversion color table is employed when the printer is operating in the first resolution mode and the second resolution mode, accordingly; and
    a color output produced using the second color table in the second resolution mode substantially colorimetrically matches a color output produced in the first resolution mode, wherein:
    adjusting the non-black primary color values using the first color table comprises:
        for each non-black primary color value, determining an amount of a respective gray component that contributes to a gray color, an amount of a respective secondary color component that contributes to a secondary color, and an amount of a respective primary component that does not contribute to the gray color or the secondary color;
        for each non-black primary color value, determining a respective gray contribution by scaling an index value of a respective gray balancing related one-dimensional look-up table with the respective gray component, wherein the respective non-black primary color value is used to index the respective gray balancing related one-dimensional look-up table;
        for each non-black primary color value, determining a respective secondary color contribution by scaling an index value of a respective one-dimensional secondary color related look-up table with the respective secondary color component, wherein the respective nonblack primary color value is used to index the respective one-dimensional secondary color related look-up table;
        for each non-black primary color value, determining a respective primary color contribution by scaling an index value of a respective one-dimensional primary component related look-up table with the primary component, wherein the respective non-black primary color value is used to index the respective one-dimensional primary component related look-up table; and
        summing the respective gray contribution, secondary color contribution, and primary contribution for each non-black primary color to obtain adjusted non-black primary color values.

2. The method of claim 1 wherein the adjusted non-black primary colors include $C_{adj}$, $M_{adj}$, and $Y_{adj}$ and are defined according to:

$$C_{adj} = \left(\frac{C_2}{C} * c\_tbl[C]\right) + \left(\left(\frac{green}{C}\right) * green\_C[C]\right) + \left(\left(\frac{blue}{C}\right) * blue\_C[C]\right) + \left(\left(\frac{gray}{C}\right) * graybal\_C[C]\right),$$

$$M_{adj} = \left(\frac{M_2}{M} * m\_tbl[M]\right) + \left(\left(\frac{red}{M}\right) * red\_M[M]\right) + \left(\left(\frac{blue}{M}\right) * blue\_M[M]\right) + \left(\left(\frac{gray}{M}\right) * graybal\_M[M]\right),$$

$$Y_{adj} = \left(\frac{Y_2}{Y} * y\_tbl[Y]\right) + \left(\left(\frac{red}{Y}\right) * red\_Y[Y]\right) + \left(\left(\frac{green}{Y}\right) * green\_Y[Y]\right) + \left(\left(\frac{gray}{Y}\right) * graybal\_Y[Y]\right)$$

where,
    the non-black primary colors of the input color print data are defined according to:
    C=cyan,
    M=magenta,
    Y=yellow;

a gray component is defined according to gray=MIN(C,M,Y);

secondary color components red, green, and blue are defined according to:
red=MIN(M-gray, Y-gray),
green=MIN(C-gray, Y-gray),
blue=MIN(C-gray, M-gray);

primary color components $C_2$, $M_2$, and $Y_2$ are defined according to:
$C_2$=(C-gray-green-blue),
$M_2$=(M-gray-red-blue),
$Y_2$=(Y-gray-red-green);

c_tbl[C] is a one-dimensional primary component related cyan TRC;

m_tbl[M] is a one-dimensional primary component related magenta TRC;

y_tbl[Y] is a one-dimensional primary component related yellow TRC;

graybal_C[C] is a one-dimensional gray balancing related cyan TRC;

graybal_M[M] is a one-dimensional gray balancing related magenta TRC; and graybal_Y[Y] is a one-dimensional gray balancing related yellow TRC.

3. The method according to claim 1 further comprising:

for each non-black primary color, retrieving a value from the one-dimensional primary component related primary color TRC as indexed by the respective non-black primary color and scaling the retrieved valued by a relative amount of the respective non-black primary color that comprises the primary component of that non-black primary color;

for each non-black primary color, retrieving a value from a first one-dimensional secondary component related primary color TRC as indexed by the respective non-black primary color and scaling the retrieved value by a relative amount of the respective non-black primary color that comprises a first secondary component of that non-black primary color;

for each non-black primary color, retrieving a value from a second one-dimensional secondary component related primary color TRC as indexed by the respective non-black primary color and scaling the retrieved value by a relative amount of the respective non-black primary color that comprises a second secondary component of that non-black primary color; and for each non-black primary color, retrieving a value from the one-dimensional gray balancing related primary color TRC as indexed by the respective non-black primary color and scaling the retrieved value by a relative amount of the respective non-black primary color that comprises the gray component of that non-black primary color.

4. The method according to claim 3 further comprising:

for each non-black primary color, determining the adjusted non-black primary color value by summing the scaled retrieved values.

* * * * *